US007649174B2

(12) United States Patent
Mammen et al.

(10) Patent No.: US 7,649,174 B2
(45) Date of Patent: Jan. 19, 2010

(54) THERMOGRAPHY CAMERA CONFIGURED FOR GAS LEAK DETECTION

(75) Inventors: Charles H. Mammen, Beverly, MA (US); Robert G. Benson, New Ipswich, NH (US)

(73) Assignee: FLIR Systems, Inc., Wilsonville, OR (US)

( * ) Notice: Subject to any disclaimer, the term of this patent is extended or adjusted under 35 U.S.C. 154(b) by 33 days.

(21) Appl. No.: 12/069,482

(22) Filed: Feb. 11, 2008

(65) Prior Publication Data

US 2009/0200466 A1 Aug. 13, 2009

(51) Int. Cl.
*H01L 31/00* (2006.01)

(52) U.S. Cl. .................................... 250/330; 250/338.1

(58) Field of Classification Search ................. 250/330, 250/338.1; 374/4, 10; 348/E5.09; 382/260
See application file for complete search history.

(56) References Cited

U.S. PATENT DOCUMENTS

| | | | |
|---|---|---|---|
| 3,662,171 | A | 5/1972 | Brengman et al. |
| 4,005,281 | A | 1/1977 | Faulhaber et al. |
| 4,555,627 | A | 11/1985 | McRae, Jr. |
| 4,772,789 | A | 9/1988 | Maram et al. |
| 5,001,346 | A | 3/1991 | Barkhoudarian |
| 5,001,348 | A | 3/1991 | Dirscherl et al. |
| 5,384,865 | A | 1/1995 | Loveridge |
| 5,656,813 | A | 8/1997 | Moore et al. |
| 5,903,659 | A | 5/1999 | Kilgore |
| 5,960,097 | A | 9/1999 | Pfeiffer et al. |
| 6,037,986 | A | 3/2000 | Zhang et al. |
| 6,040,568 | A | 3/2000 | Caulfield et al. |
| 6,507,018 | B2 | 1/2003 | Young |
| 6,721,458 | B1 | 4/2004 | Ancin |
| 6,803,577 | B2 * | 10/2004 | Edner et al. ............ 250/339.09 |
| 6,822,742 | B1 | 11/2004 | Kalayeh et al. |
| 6,958,783 | B2 | 10/2005 | Alvarez |
| 6,995,846 | B2 | 2/2006 | Kalayeh et al. |
| 7,035,475 | B1 | 4/2006 | Chen et al. |
| 7,075,653 | B1 | 7/2006 | Rutherford |
| 7,132,648 | B2 | 11/2006 | Ratiff et al. |
| 7,133,072 | B2 | 11/2006 | Harada |

(Continued)

OTHER PUBLICATIONS

The International Search Report and Written Opinion of the International Searching Authority issued in connection with PCT/US2009/033652 on Feb. 10, 2009.

*Primary Examiner*—David P Porta
*Assistant Examiner*—Marcus H Taningco
(74) *Attorney, Agent, or Firm*—The H. T. Than Law Group

(57) ABSTRACT

A portable thermography camera system (100) renders a video image of a survey scene over a narrow spectral bandwidth corresponding with an absorption band of a gas to be detected in the video image. The camera system forms a scene image onto a focal plane array (108) and generates a corrected image signal (162) corresponding with irradiance values at a plurality of locations of the scene image. The camera system further generates a temporally filtered image signal (168) corresponding with a temporal characteristics of the image signal (162) over a selected number of prior image frames. A difference block (166) reduces the temporally filtered image signal (168) by a scaling factor and produces a difference image by subtracting the scaled temporally filtered image signal from the corrected image signal (162). The displayed difference signal improves the visibility of the gas to be detected.

31 Claims, 6 Drawing Sheets

U.S. PATENT DOCUMENTS

| | | |
|---|---|---|
| 7,134,322 B1 | 11/2006 | Baird |
| 7,136,842 B2 | 11/2006 | Pirim |
| 7,151,787 B2 | 12/2006 | Kulp et al. |
| 7,181,047 B2 | 2/2007 | Pirim |
| 7,189,970 B2 | 3/2007 | Racca et al. |
| 2006/0091310 A1 | 5/2006 | Furry |
| 2006/0146161 A1 | 7/2006 | Farrier |
| 2007/0292024 A1 | 12/2007 | Baer et al. |

* cited by examiner

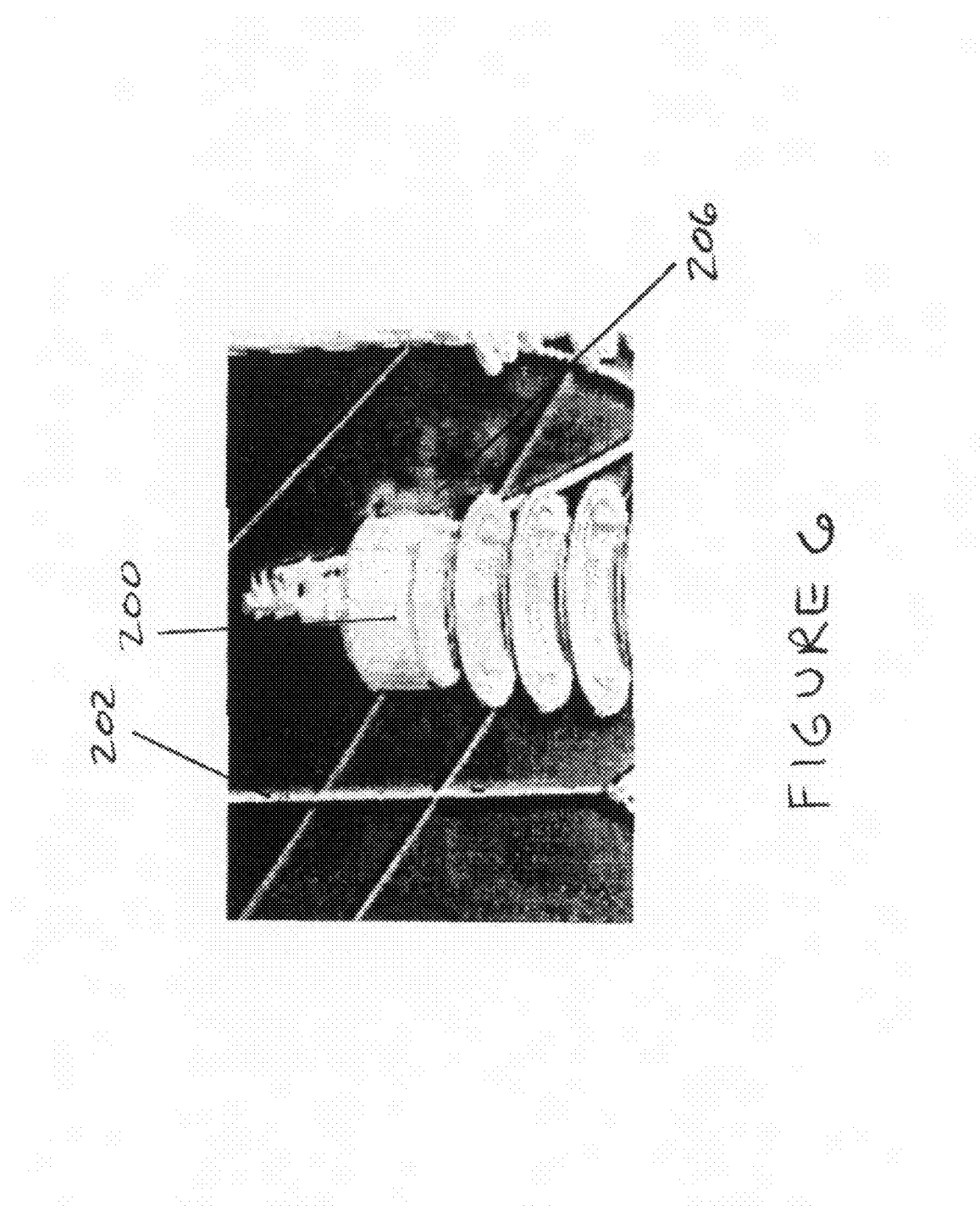

THERMOGRAPHY CAMERA CONFIGURED FOR GAS LEAK DETECTION

BACKGROUND OF THE INVENTION

1. Field of the Invention

The present invention relates to an infrared video camera system for rendering video images of survey scenes containing gas leaks. More specifically, the invention is a method and apparatus for generating temporally filtered images of the survey scene, scaling the temporally filtered images to reduce signal values of the temporally filtered images and generating a difference image by subtracting the scaled temporally filter video images from current video images to improve the visibility of gas plumes in the difference image.

2. Description of the Related Art

Thermographic video cameras are used to survey scenes to detect gas leaks. Many industrial gas leaks are invisible to the human observer. However, industrial gases often absorb infrared radiation at known absorption bands. Hand held video thermography camera systems are commercially available to detect gas leaks by viewing infrared images of the gas leaks. The gas plumes can be distinguished from other regions of the scene image because the gas plumes absorb infrared radiation and therefore have a reduced radiosity compared with the other regions.

Early versions of gas leak detecting thermography cameras include an infrared illuminator to flood the survey scene with infrared radiation and to render video images of the scene using the backscattered illumination. In particular, the scene is illuminated at infrared wavelengths corresponding to an absorption band of a gas to be detected. Laser illuminators having a fixed infrared spectral bandwidth as well as laser illuminators having a variable spectral bandwidth have been used in gas detections systems. The camera system forms a video image of the survey scene using backscattered illumination. The video image shows absorbing gas plumes as dark areas having lower levels of backscattered infrared radiation than other areas of the scene. The infrared illumination increases the visibility of the gas plumes with respect to background elements. In addition, the camera systems may include a narrow spectral band pass filter to limit the spectral bandwidth of video images of the scene to a narrow spectral band approximately matching the absorption band of the gas to be detected. Examples of gas detecting thermography cameras that include an infrared illuminator for illuminating the survey scene at the spectral bandwidth of an absorption band of a gas being detected are disclosed in U.S. Pat. Nos. 4,555,672, 7,075,653, 6,995,846, 6,822,742, 7,151,787, 4,772,789, 7,134,322).

Backscattering thermography cameras have several drawbacks. These include the inability to view gas plumes against sky or other non-reflecting backgrounds, the need to use eye safe illuminators, and the limitation that the illuminator beam divergence limits the distance over which the illuminator can effective illuminate a scene. In addition, the cost and complexity of including an illuminator in the video camera system is an additional drawback.

More recently passive thermography cameras have been provided to image gas plumes without illuminating the survey scene. One example of a passive imaging device configured to detect the presence of methane and other hydrocarbon gas plumes is the video thermography camera disclosed in U.S. patent application Ser. No. 11/298,862, by Furry, which was published as US2006/0091310A1, and as WO2005001409, and which is incorporated by reference herein, in its entirety. A second example of a passive thermography camera configured to detect the presence of methane and other hydrocarbon gas plumes is commercially available from FLIR SYSTEM Inc. of Wilsonville, Oreg. and North Billerica, Mass., USA; sold under the trade name ThermaCam® GasFindIR™. A third example of a video thermography camera configured to detect the presence of the industrial gases having an absorption band approximately centered at 10.6 µm is disclosed in co-pending U.S. patent application Ser. No. 11/726,918, by Benson et al., filed on Mar. 23, 2007, which is incorporated by reference herein, in its entirety, and which is commonly assigned to the owner of the present invention. A fourth example of a passive thermography camera configured to detect the presence of sulfur hexafluoride ($SF_6$), ammonia, ($NH_3$), uranium hexafluoride ($UF_6$) and other industrial gas plumes is commercially available from FLIR SYSTEM Inc. of Wilsonville, Oreg. and North Billerica, Mass., USA, and sold under the trade name GasFindIR LW™.

Since passive thermography cameras do not rely on illumination to flood a survey scene, they can detect gas plumes over greater distances, they avoid eye safety issues associated with illuminating survey scenes and they eliminate the cost and complexity of including an illuminator in the camera system. However, passive thermography cameras usually requires more strict control on the spectral bandwidth of the video image and the reduction of signal noise in order to generate video images with enough contrast between gas plumes and other areas of the survey scene video image.

To reduce the spectral bandwidth of a scene image formed by the camera system, a narrow spectral band filter is positioned between a camera lens system and its photo sensor. The spectral band pass filter narrows the spectral irradiance of a scene image formed by the lens onto the photo sensor to approximately match the scene image spectral bandwidth with an absorption bandwidth of a gas to be detected. While matching the spectral band width of the scene image to an absorption band of the gas to be detected improves the ability of the camera system to distinguish between background elements and absorbing gas plumes, the narrow bandwidth of the scene image significantly reduces its total irradiance resulting in the need to increase sensor gain to render a video image. However, the increased sensor gain also amplifies noise in the image signal.

To reduce non-scene thermal noise, passive thermography cameras include a cryocooler to lower the operating temperature of the photo sensor, the spectral band pass filter and other support structures that may emit infrared radiation over the absorption bandwidth of the gas to be detected. While cooling the camera elements reduces thermal noise enough to provide adequate performance in many applications, improvements in passive camera systems are still needed e.g. to identify a gas plume in a video image when the background of the video image is sky, water, snow, or other non-reflecting backgrounds. Accordingly there is still a need to increase the visibility of gas plumes in passive thermographic video images.

It is know to use temporal filtering to reduce random signal noise from scene images to enhance video images. Temporal filtering in video image processing uses a plurality of recent image frames, collected over a selected time period, e.g. 10-100 video frames, and averages, integrates or otherwise temporally filters signal values at each location of the scene image to generate a temporally filtered image having reduce signal noise. In some applications, displaying the temporally filtered image improves the visibility of certain elements in the scene. However, temporal filtering tends to smooth or blur dynamic or transient elements of a scene image and gas plumes are transient elements, especially at their outer edges.

It is also known to subtract consecutive image frames from each other to improve the visibility of dynamic or transient elements in a scene image. The resulting difference image tends to include only dynamic or transient elements that have changed from the prior image frame. However the difference image has zero signal values at locations where consecutive scene images are substantially unchanged and such images can be disorienting because the difference image only shows dynamic or transient elements and there is no way to relate the dynamic elements with unchanged elements from scene to scene. Moreover when there are no dynamic elements in the scene the resulting difference image signal is zero at all location and the video image is a blank screen.

One attempt at using a difference image in a gas detecting camera system is disclosed in U.S. Pat. No. 5,656,813, to Moore et al., entitled APPARATUS FOR IMAGING GAS. In the '618 patent two cameras are used to render separate video images of the same scene and the separate video images are combined and displayed on a single display device. The first video camera is configured to render a video image of the scene at infrared wavelengths. The second video camera is configured to render a black and white video image of the survey scene at visible wavelengths. The infrared camera includes image processing systems for generating a temporally filtering image to reduce random noise. The temporally filtered image is subtracted from current images of the survey scene and the resulting difference image emphasizes the dynamic or transient elements of the survey scene, which include gas plumes. However since the image subtraction removes non-varying background elements of the survey scene from the infrared video image, the visible camera image is combined with the video camera image to replace the background elements. The problem with the '618 camera system is that it is complex and requires a two camera systems.

Instead, it is desirable to provide a single camera system capable of combining temporal filtering to reduce random noise with image subtraction to enhance the visibility of dynamic elements without completely eliminating background elements from the video image.

BRIEF SUMMARY OF THE INVENTION

The present invention overcomes the problems cited in the prior art by providing a portable infrared thermography camera (100) including a lens element (104) for collecting radiation from a survey scene (106) and forming a scene image onto a focal plane array image sensor (110). The image sensor (110) comprises a plurality of photosensitive elements disposed at a plurality of locations over the scene image and each image sensor generates an analog image signal in proportion to an irradiance of the scene image at corresponding locations of the scene image. A scene image signal comprises a series of the analog signals read out from the image sensor row by row, one sensor at a time. The analog image signals are refreshed at a video frame rate with each new video frame generating a new scene image signal. The analog scene image signals are delivered to an optical signal processor (118) which includes an analog to digital converter (152) and logic (154, 158) and memory (156, 160) blocks for digitizing and correcting the analog scene image signals and form a corrected image signal (162).

The corrected image signal is fed to a temporal filter (164) which cooperates with a temporal filter memory (170). The temporal filter receives the corrected image signal (162) and a temporally filtered scene image (168) from the temporal filter (170). The temporal filter (164) combines the corrected image signal (162) and the temporally filtered scene image (168), updates values of the temporally filtered scene image (168), and stores an updated temporally filtered image (168) in the temporal filter memory (170). In addition the updated temporally filtered image (168) is delivered to an image difference block (166). The temporally filtered scene image (168) includes a temporally filtered irradiance value for each sensor location in the scene image. The temporally filtered irradiance values may comprise an average, mean or other temporally characteristic irradiance value characteristic of the irradiance at the scene location over a selected number of prior video frames.

The image difference block (166) scales the temporally filtered scene image (168) by multiplying the temporally filtered irradiance value for each sensor location in the scene image by a scaling factor ranging from 0.0 to 1.0. The scaling factor may be selectable by a user or may comprise a fixed value. The scaled temporally filtered scene image is then subtracted from the corrected scene image signal (162) to generate a difference image (172). The difference image is then formatted and displayed on a display device (116).

The image sensor (110) has a useful a spectral responsivity that includes an absorption band of a gas to be detected. In addition, a spectral band pass filter (110) is disposed between the lens element (104) and the image sensor (108) to limit the spectral bandwidth of the scene image to a spectral bandwidth approximately corresponding with the absorption band of the gas to be detected.

The present invention further overcomes the problems cited in the prior art by providing a method for rendering a video image of a survey scene. The method includes forming a scene image onto a focal plane array and generating a scene image signal (162) comprising a series of scene image signals corresponding with irradiance values at a plurality of locations of the scene image. The scene image signal is continuously updated at a video frame rate. In addition the method includes generating a temporally filtered image signal (168) based on temporal characteristics of irradiance values at each of the plurality of locations of the scene image over a selected number of previous video frames. The temporally filtered image signal (168) is also continuously updated at the video frame rate. The temporally filtered scene image is scaled by multiplying the temporally filtered image signal by a scaling factor k. The scaling factor k reduces each signal value of the temporally filtered image signal (168). The scaled temporally filtered image signal is then subtracted from the scene image signal (162) to generate a difference image signal and the difference image signal is displayed on a video display device.

BRIEF DESCRIPTION OF THE DRAWINGS

The features of the present invention will best be understood from a detailed description of the invention and a preferred embodiment thereof selected for the purposes of illustration and shown in the accompanying drawing in which:

FIG. 6 illustrates video frame of a survey scene rendered using a scaling factor of 0.5 according to one embodiment of the present invention.

DETAILED DESCRIPTION OF THE INVENTION

Definitions

The term radiosity as used herein is defined as the total power including all wavelengths of electromagnetic radiation emitted and or reflected from a survey scene and is generally measured in $W/m^2$ or equivalent units.

The term irradiance as used herein is defined as the total power including all wavelengths of electromagnetic radiation falling on a surface per unit surface area and is generally measured in $W/m^2$ or equivalent units.

The term spectral irradiance as used herein is defined as the power per unit area per unit wavelength of electromagnetic radiation falling on a surface, and is generally measured in $W/m^2/nm$.

The term transmittance as used herein is defined as a ratio expressed as a percentage of radiation intensity transmitted through a medium (I) to radiation intensity incident on the medium ($I_o$), at a specified wavelength.

The term spectral responsivity as used herein is defined as the ratio of photo current generated by a photo sensor per unit irradiance per unit wavelength and may be measured in mA/W/nm or other suitable units.

Figure 1:
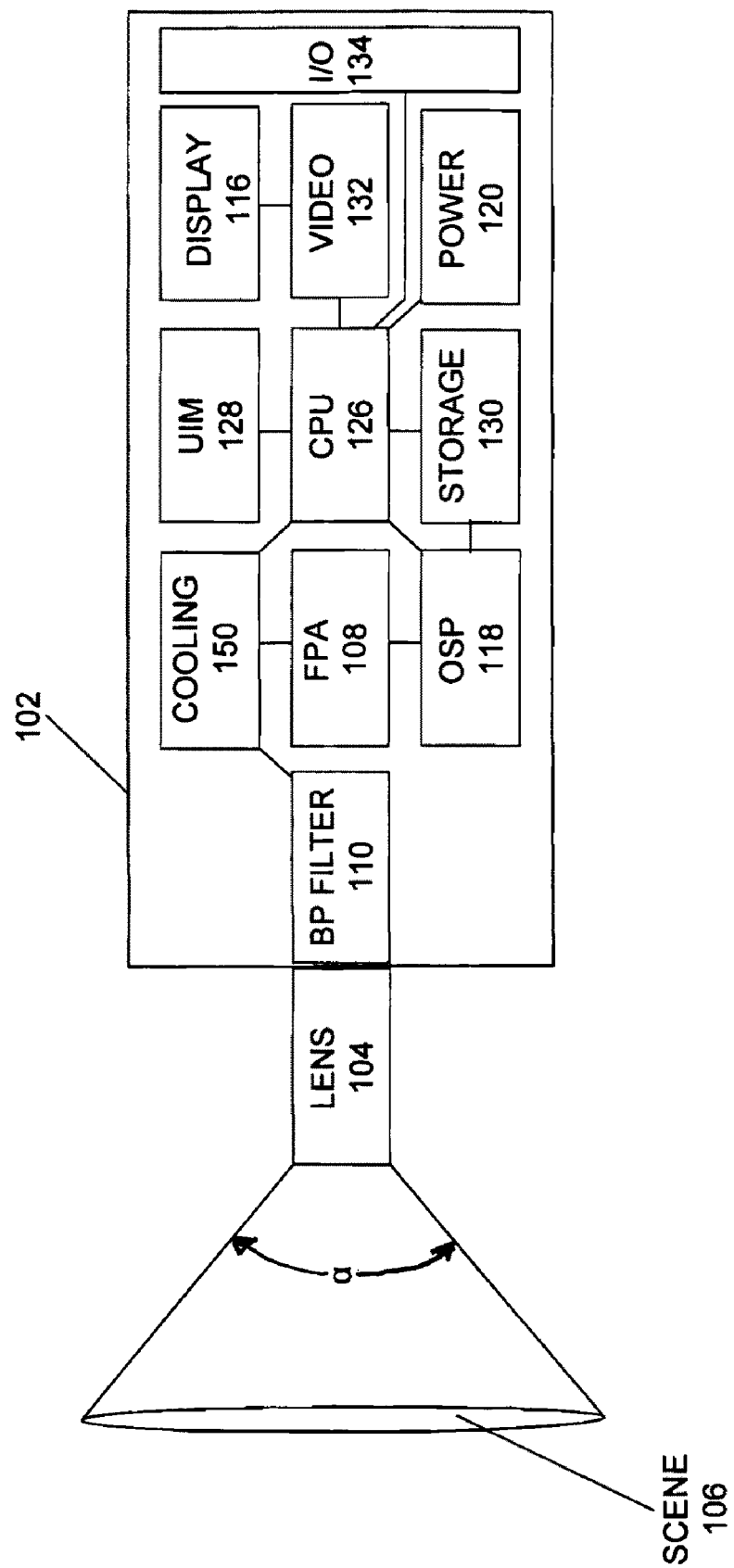
FIG. 1 illustrates a block diagram showing a camera system according to the present invention.
Figure 2:
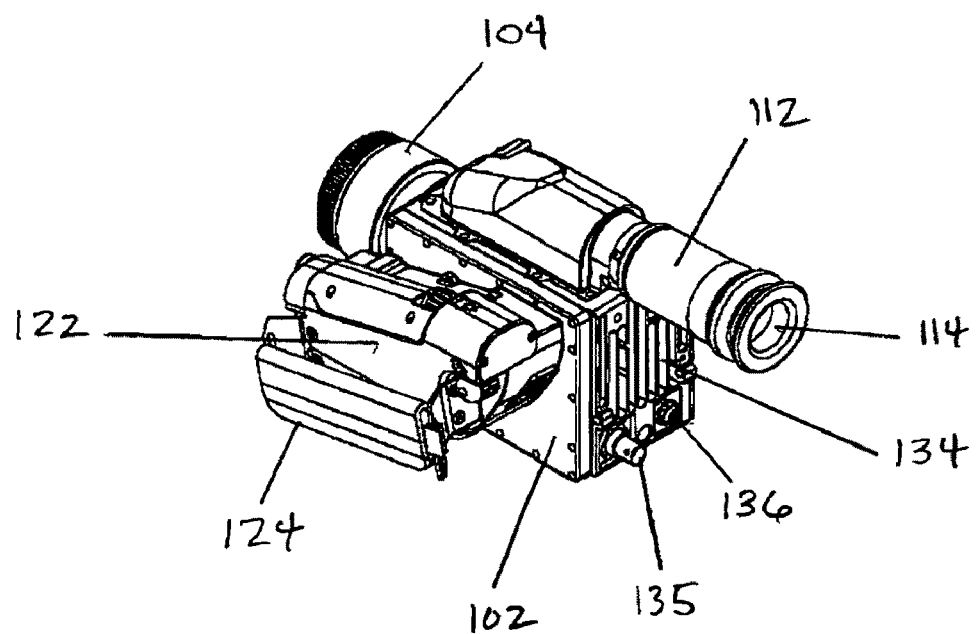
FIG. 2 illustrates an isometric view of one embodiment of a camera system according to the present invention.

Referring to FIGS. 1 and 2, a hand held portable thermography camera system 100, according to a preferred embodiment of the present invention, comprises a housing 102 and a lens system 104 extending out from the housing. A view finder assembly 112 extends upward from the housing 102 at a top side thereof. The view finder 112 includes an eye piece 114 for a user to look through in order to view a video display 116 housed inside the housing 102 or inside the view finder 112. The video display 116 displays video images being rendered by the camera system 100 and may comprise a black and white or a color video display. Accordingly, a user looks into the view finder 112 to view a video image of a survey scene and points the lens system 104 at survey scenes that the user desires to inspect.

The preferred camera system 100 is configured for portable gas leak detection. As such, a user carries the portable camera system 100 and points the lens system 104 at survey scenes 106 that include pressurized gas lines, gas containers or other gas processing equipment to look for gas or vapor escaping into the surrounding atmosphere. Normally many leaking gas plumes are invisible to a human observer looking at the survey scene with unaided eyes. However by viewing a video image of the survey scene 106 rendered by the camera system 100, the user is able to detect and study a gas plume in the video image. If a gas plume is detected, the user may then study the gas plume more closely, e.g. to detect a source of the gas leak, by zooming the camera lens system to view the gas plume at higher magnification or by moving closer to the gas plume.

The lens system 104 collects radiant energy from the scene 106 and forms a focused image of the scene 106, hereinafter referred to as a "scene image," onto a focal plane array 108. The lens system 104 may comprise a zoom lens system with automatic and or manual image focusing elements and an automated and or manual iris for changing the lens F# as required to adjust a lens iris diameter for different levels of survey scene radiosity.

The scene radiosity generally includes a broad spectral range e.g. over nearly all wavelengths. However, a spectral band pass filter 110 is positioned between the lens system 104 and the focal plane array 110 to limit the spectral range of the scene image to a desired spectral range. In particular, the transmittance profile of the spectral band pass filter 110 is ideally matched to an absorption band of the gas to be detected. More specifically, the transmittance profile of the spectral band pass filter 110 ideally has a peak transmittance at a wavelength approximately matching the wavelength of peak absorption by the gas to be detected and the spectral band pass filter transmittance profile has a 50% spectral bandwidth approximately matched to a 50% absorption bandwidth of the gas to be detected. Otherwise, the band pass filter transmittance profile ideally has substantially minimal transmittance at wavelengths not included in the absorption bandwidth of the gas to be detected. Of course other spectral filter transmittance profiles are usable without deviating from the present invention. In particular, the camera system 100 may include a spectral band pass filter having a spectral transmittance profile having a spectral bandwidth sized to includes absorption bands of several different gases or to include two absorption bands of the same gas.

The focal plane array 108 comprises an array of photo sensors, e.g. photodiodes, each having a surface area for receiving incident radiation thereon on and each having a spectral responsivity that includes the entire spectral bandwidth of the band pass filter 110. In many gas detecting applications, image plane sensors are constructed from a two dimensional array of small area photodiodes comprising Indium Antimonide (InSb) which has a useful spectral responsivity over the infrared wavelength range of 1.0-5.5 μm and with a more desirable useful range of approximately 3.0-5.0 μm. However other sensor elements are usable with the present invention as may be required to detect gases having infrared absorption bands above 5.5 μm. In particular, a gas detecting camera system 100 according to the present invention may include a focal plane array 108 comprising customized quantum well infrared photo detectors, (QWIP) having a peak spectral responsivity approximately tuned to a desired gas absorption bandwidth in the spectral range extending from 5.5 μm to 15.0 μm. One example of such a camera system is described in co-pending and commonly assigned U.S. patent application Ser. No. 11/726,918, by Benson et al., filed on Mar. 23, 2007.

The camera system 100 includes a conventional cryogenic cooling device 150 for cooling the focal plane array 108 and the spectral band pass filter 110 to low operating temperatures e.g. below about 100° K. and ideally below temperatures that cause infrared emissions over the absorption band of the gas to be detected, e.g. temperatures down to about 60° K. In addition, the focal plane array 108 and spectral band pass filter 110 are housed in an evacuated Dewar assembly to thermally insulate the FPA 108 from its surroundings. The FPA 108 mounts directly to a cold finger, not shown, of the cryogenic cooler 150 and the FPA 108 and band pass filter 110 are supported on a thermally conductive support element, not shown, that extends between the FPA 108 and band pass filter 110 and provides a thermally conductive path between the cold finger and the elements to be cooled. By operating the camera system with the FPA 108, the band pass filter 110, and the support elements at a temperature that is low enough to significantly reduce infrared emissions at wavelengths within the spectral bandwidth of band pass filter 110, thermal noise generated by the camera system itself is reduced and this enables the camera system 100 to better distinguish infrared wavelength absorbing gas plumes from non-absorbing background areas of a thermal image.

The camera system 100 includes an electronic system that includes a central processing unit, (CPU) 126 such as a commercially available integrated circuit microprocessor chip having digital data processing hardware, memory registers and cache memory for temporary data storage. The CPU 126 is interconnects with other elements of the electronic system to operate and control the camera system according to program steps stored in the CPU 126, in a digital data storage module 130 and in other elements as required. The camera system 100 includes a second integrated circuit microprocessor chip in the form of a field programmable gate array (FPGA) operating as an optical signal processor (OSP) 118. The OSP 118 includes digital data processing hardware, memory registers and cache memory for temporary data storage as well as various interfaces for connecting with the CPU 126, the digital data storage module 130, and with external devices through an input output (I/O) module 134. The OSP 118 is programmable, via its connection with external devices, and includes programs stored thereon for performing video data processing and the like. The OPS 118 functions to receive analog photo signals from the FPA 108, to digitize the analog photo signals and to perform image processing steps as required to generate a video image of the scene. The video image generated by the OSP 118 may be delivered out of the camera, system via the I/O module 134 or stored in the storage module 130. Preferably, the video image generated by the OSP 118 is delivered to a video module 132 to be formatted for display on the display device 116.

The digital data storage module 130 functions to store digital data and program instructions therein and interfaces with the CPU 126, the OSP 118 and with other modules, as may be required to exchange digital data and instructions with the other modules. The data storage module 130 may comprise one or more permanently installed, removable or externally connected memory devices using solid state, optical or magnetic memory storage devices including solid state random or dynamic access memory (RAM, DRAM), non-volatile FLASH memory, optical compact disk memory, (CD) digital video disk memory (DVD), magnetic hard or soft disk memory and the like.

The camera system further includes a user interface module (UIM) 128, comprising a plurality of user interface control elements such as one or more toggle switches, variable position dials, knobs, key pads, or the like, communicating with the CPU 108, the OSP 118, the lens system 104, or other modules as required. Preferably, the user interface controls are positioned on external surfaces of the housing 102 for ergonomic operation of the camera system 100 while looking through the eyepiece 114. The user interface control elements allow a user to select various camera operating modes, and control the lens system 104 as may be required to view survey scenes at different magnifications, in different lighting conditions or with different image processing configurations.

The camera system 100 includes a power module 120 and the input output (I/O) module 134. The power module 120 comprises a battery stored in a battery compartment 122 and other power distributing and conditioning elements. The battery may comprise a commercially available high capacity rechargeable Nickel Metal Hydride (NiMH), Nickel Cadmium (NiCd), or Lithium Ion (LiION), battery and the camera system 100 may be sold with a separate battery charger. Alternately, any other self contained power source may be used to provide a source of power to the camera system 100.

The power module 120 may include one or more input terminals, associated with an I/O module 134, for receiving power inputs from a DC power source, such as a vehicle power system, or from an AC power source such as a conventional AC power line. The power inputs may be used to power the camera directly, to recharge a battery installed in the battery compartment 122, or both. Otherwise, the I/O module 134 includes various wire connecting ports extending through the camera housing 102 interfacing with internal systems and may include a wireless transceiver for communicating with external devices over radio or microwave frequencies. In particular, the I/O module 134 includes power input ports, a digital video output port 135 for interfacing with an external video display device and an analog video output port 136 for interfacing with an analog video storage and or display device configured to receive separate video, (S-video). In particular, the camera system 100 may be sold with a separate video recording device usable to store and display video images for remote viewing.

Figure 3:
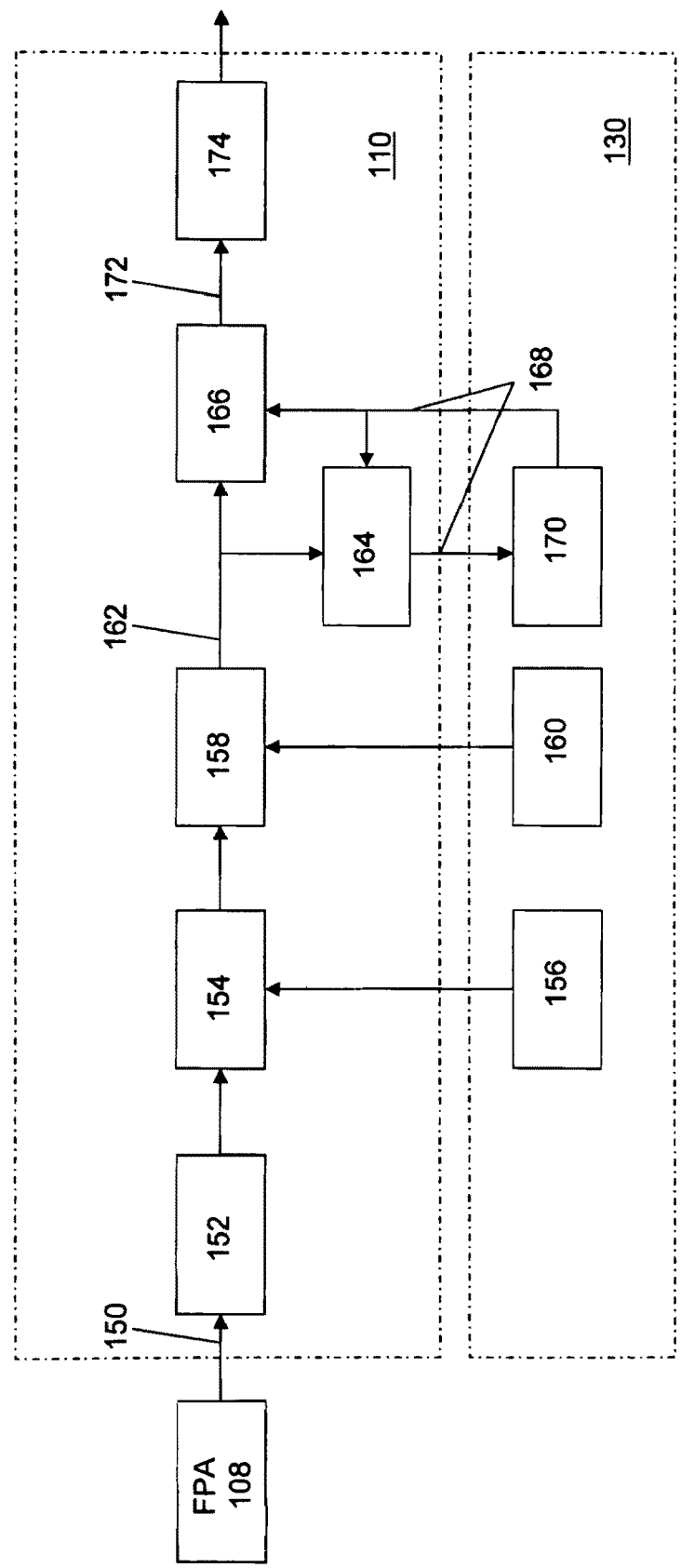
FIG. 3 illustrates a schematic diagram depicting image processing and memory elements of a camera system according to the present invention.

Referring now to FIG. 3, a schematic diagram shows the interface and operation of the FPA 108 with elements of optical signal processor, OSP 118 and elements of the digital data storage module 130. As described above, the lens system 104 forms a scene image onto the FPA 108. The scene image is formed over a plurality of photo sensor elements with the irradiance level at each sensor element providing a sensor signal corresponding with a radiosity level at corresponding locations of the scene 106. Accordingly irradiance levels at each sensor location vary in response to changes in camera pointing direction, to changes in scene radiosity, or both.

The camera system operates to capture a current scene image signal by performing a complete read out of every sensor in the FPA 108. In particular, the FPA 108 includes a readout circuit that serially collects an analog sensor signal from each photo sensor in the array on a row by row basis. The readout circuit integrates charges accumulated at each photo sensor surface over an exposure time and generates an analog sensor signal in proportion to the charge accumulated over the exposure time. Exposure times may range from about 10-30 ms. In some embodiments, the cameras system may be configured to vary the exposure time as required to compensate for low or high scene radiosity levels.

Accordingly, the FPA 108 delivers a substantially continuous stream of analog sensor signals 150 to the OSP 118. A complete current image signal comprises a readout from every sensor in the array. The image signal is refreshed at a video frame or refresh rate, e.g. ranging from 30-100 images per second. Accordingly a new image signal or image frame is delivered to the OSP 118 approximately every 10 to 33 ms. Generally the image signal includes one irradiance value for each photo sensor in the FPA 108 and a typical FPA 108 include more than 50,000 photo sensors.

The OSP 118 includes an analog to digital (A/D) converter 152 for receiving the stream of analog sensor signals 150 and converting the analog signal stream 150 into a stream of corresponding digital sensor signals. Each digital sensor signal comprises a signal value corresponding with an irradiance level at a location of the scene image. The signal values range from low signal values, corresponding with locations of the scene image having minimal irradiance levels, to high signal values, corresponding with locations of the scene image having maximum irradiance levels. Alternately, the signal values can be reversed with maximum digital signal values corresponding with areas having minimum irradiance levels. Typical digital signals values correspond with rendering a grey scale reproduction of the scene on a video display device with black corresponding with areas of the scene image having minimum irradiance values and white corresponding with areas of the scene image having maximum irradiance values. The camera system 100 may produce digital signal values having an 8 to 16 bits dynamic range (256 to 65K gradations) depending upon the application but other dynamic ranges are useable without deviating from the present invention.

Since the scene image formed by the camera system 100 has a narrow infrared spectral bandwidth, high temperature elements in the survey scene tend to emit the highest levels of infrared radiation and therefore have high irradiance levels in the scene image. Accordingly, the highest temperature elements in an image scene are rendered as white or nearly white in a video image of the scene. However, areas of the scene that absorb infrared radiation over the narrow spectral band width of scene image tend to have low irradiance levels in the scene image. Accordingly, gas plumes that absorb over the narrow infrared spectral bandwidth of the scene image are rendered black or nearly black in a video image of the scene. In practice, a gas plume resembles black or grey smoke in a video image rendered by the camera system 100, as is shown in the example image of FIG. 6.

After digitization, each digital sensor signal is adjusted by a gain offset correction block 154 to eliminate variation in sensor to sensor responsivity. The gain offset block 154 applies a gain and offset correction to each digital sensor signal as the serial stream of sensor signals passes through the gain and offset block 154. Gain and offset correction values corresponding with each sensor in the FPA 108 are stored in the memory block 156. The stored gain and offset correction values are recalled from the memory block 156 and matched with appropriate sensors to adjust the digital sensor signal as required.

After gain and offset corrections, each digital sensor value is adjusted by a dead pixel replacement block 154 which inserts a digital sensor signal for non-operating sensor locations of the scene image. The dead pixel replacement block 154 estimates what the dead sensor signal would be if it were operating by interpolating a sensor signal value based upon sensor signal values at sensor locations surrounding the non-operating sensor locations. A dead pixel memory block 160 stores the location of non-operating sensors and stores digital sensor values at sensor locations surrounding the non-operating sensor locations in order to make an appropriate estimate to be inserted into the stream of digital sensor signals.

The stream of digital sensor signals exiting from the logic block 158 comprises a corrected image signal 162. The corrected image signal 162 includes a digital sensor signal corresponding with each sensor location of the scene image. The corrected image signal 162 is fed to a temporal filter block 164. Simultaneously, the temporal filter block 164 receives a temporally filter image 168 from a temporal filter memory 170. The temporally filtered image 168 comprises a stream of temporally filtered image signals corresponding with each sensor location in the scene image. Each temporally filtered image signal comprises an average, mean or other temporally weighted signal value that is representative of image signals at the same sensor location over a selected number of prior image frames or corrected image signals. The temporal filter 164 combines the corrected scene image signal 162 with the temporally filtered image signal 168 at each sensor location and uses temporal filter algorithms to generate a new temporally filtered image signal value at each sensor location and to update the temporal filter memory 170 with the new temporally filtered signal values. Accordingly the temporally filtered image 168 is refreshed at the vide refresh rate.

More generally, temporally filtered image signal may comprise any temporally weighted signal values derived by combining corrected image signal values at each sensor location with a plurality of prior image signal values at the same sensor location. The new temporally filtered image 168 comprises a temporally weighted signal that depends on the difference between the corrected image signal 162 and prior temporally filtered image. At individual sensor locations if the corrected image signal 162 and the temporally filtered image signal 168 are substantially identical, the new temporally filtered image value is unchanged by temporal filter 164. Conversely, at individual sensor locations where the corrected image signal 162 and the temporally filtered image signal 168 are different, the new temporally filtered value is adjusted in accordance with how dissimilar the two values are. According to the present invention, the temporal filter block 164 utilizes a non-linear adaptive temporal filter. Such filters are known in the art and one example filter is disclosed in U.S. Pat. No. 5,384,865 by Loveridge entitled ADAPTIVE HYBRID MEDIAN FILTER FOR TEMPORAL NOISE SUPPRESSION.

Figure 4:
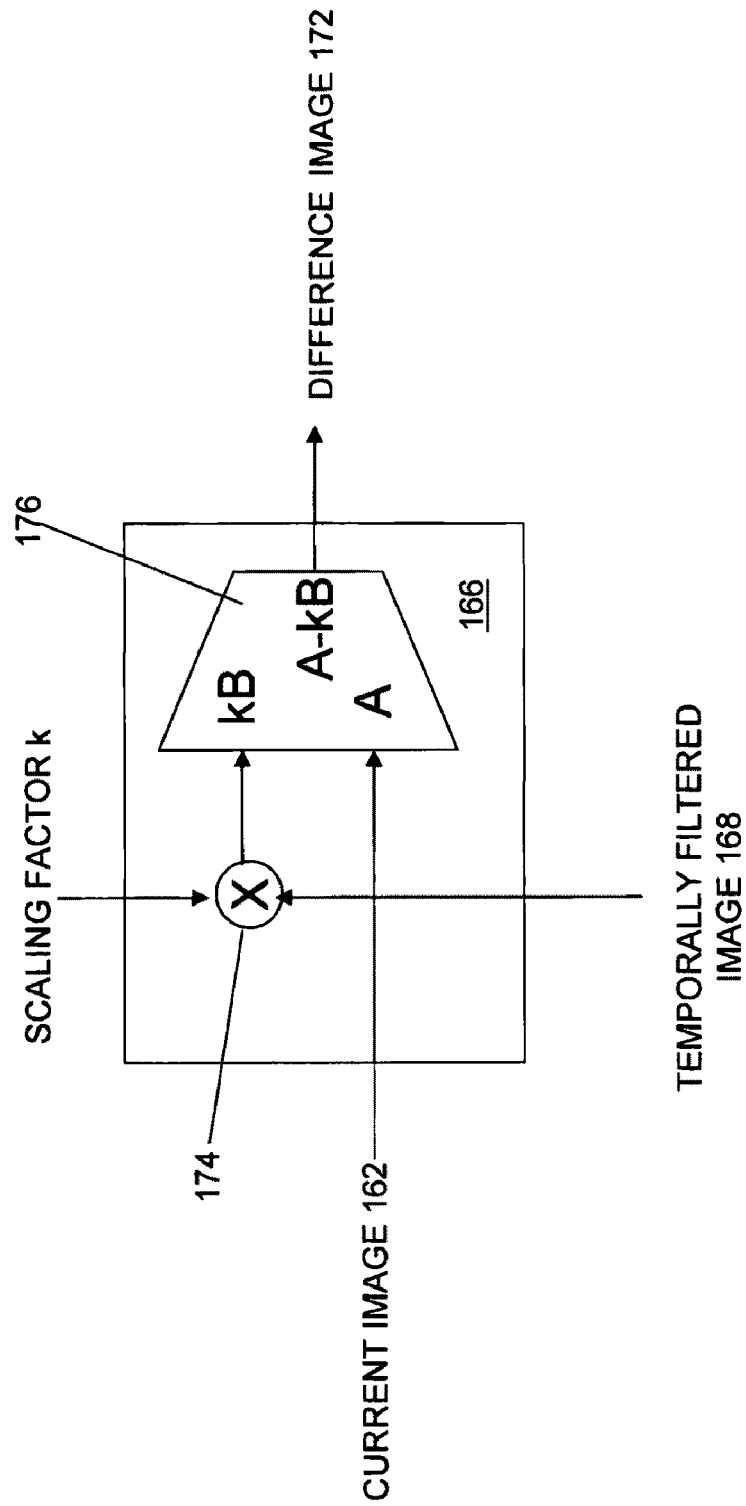
FIG. 4 illustrates a schematic diagram depicting an image differencing block of a camera system according to the present invention.

Referring now to FIGS. 3 and 4, an image differencing block 166 receives the corrected image 162 and the temporally filtered image 168 therein. In FIG. 4, corrected image signal values are indicated by the reference letter "A" and temporally filtered image signal values are indicated by the reference letter B. The temporally filtered image 168 is delivered to a multiplier block 174 which multiplies temporally filtered image signal values B by a scaling factor "k." The scaling factor "k" ranges from 0.0 to 1.0 and may be selected by a user or otherwise generated according to pre-selected criteria. The product of the scaling factor "k" and the temporally filtered image values B produces scaled temporally filtered image values "kB." Except when temporally filtered image signal values are zero, (no irradiance in the scene image), each scaled temporally filtered image value is less than the temporally filtered image value. After scaling, the scaled temporally filtered image values "kB" are subtracted from corrected image signal values A by a difference block 166 thereby generating a difference image 172. The difference image 172 comprises a stream of difference image signal values corresponding with each sensor location of the scene image. When the scaling factor k has a value of 1.0 the full signal value of the temporally filtered image 168 signal is subtracted from the corrected image 162. When the scaling factor k has a value of 0.0, all of the values of the scaled temporally filtered image are zero and the difference image 172 is identical to the corrected image 162.

The difference image 172 is further processed within the OSP 118 and delivered to the video module 132 for display on the display device 116. The video module 132 also functions to generate text and other graphic elements to display on the display device 116. The text and other graphic elements displayed on the display device may include any information that may be useful to the user, including the value of the scaling factor k used to generate the video image. The text and graphic elements may be displayed as an overlay to the video image or the text and graphic elements may be displayed on a menu or the like.

In cases where the camera system pointing axis remains substantially stationary, the survey scene is fixed and much of the scene image has a substantially non-time varying irradiance over time intervals of a few seconds. This is especially true of fixed background elements, e.g. buildings, trees, sky, water bodies, etc. Over longer time intervals, the irradiance of fixed background elements in the scene image may vary slowly e.g. only due to slowly varying illumination changes such as over a 24 hour day. Alternately, the irradiance of fixed background elements in the scene image may vary abruptly such as when artificial lights are turned on and off and then remain substantially unchanged for a long period. Accordingly, survey scene images include non-time varying or slowly time varying background elements that are substantially unchanged over short time intervals such a 1-10 seconds or over about 30-1000 image frames.

In addition, to background elements, survey scene images may include dynamic elements causing more rapid irradiance variations in the scene image. Dynamic elements may comprise moving elements, e.g. vehicles moving through the scene, fixed elements with moving parts, e.g. a fan, scene illumination changes, e.g. cloud movement or the like, thermal transfer, e.g. from hot objects to cooler surroundings, or an escaping gas plume. Conversely in cases where the camera pointing axis is moving, e.g. panning a survey scene, the entire scene becomes is a dynamic element and there are substantially no non-time varying background elements.

In gas detection, the non-temporally varying background elements may comprise conduits, storage containers, structural elements or other stationary equipment as well as sky and or a body of water. Using the camera system 100, when the camera pointing axis is stationary, image signals corresponding with background elements remain substantially constant in the temporally filtered image 168, especially when the temporal image time constant is short, e.g. 10-1000 video frames, (e.g. 0.2-20 sec). Under these conditions the camera system 100 is operable to subtract the full value of the temporally filtered image 168 from the corrected image 162 by setting the scaling factor to 1.0. The resulting difference image 172 is substantially an image of only the dynamic elements of the scene image. While a video image of only the dynamic elements of the survey scene may be useful in some applications, applicants have found that completely removing the non-temporally varying background elements from the difference image 172 is disorienting to a user viewing the difference image on the display device 116. In particular, when the non-temporally varying background elements are not included in the video image it is difficult for the user to realized what scene the camera is pointed at and if there are no dynamic elements in the survey scene, the video image includes no image, e.g. displaying a substantially a monotone or monochrome image on the display device 116. Moreover, by not including background elements in the video image of a survey scene, it is difficult for the user to associate dynamic elements, e.g. a gas plume with a background element and therefore difficult to determine the source of a gas leak.

Alternately, the camera system 100 is operable to render unaltered video image of the scene image by setting the scaling factor to 0.0 such the scaled temporally filtered image has zero values at all sensor locations and the difference image 172 is identical to the corrected scene image 162. However a preferred mode for operating the camera system 100 is to set the scaling factor an intermediate value e.g. 0.25-0.75 to reduce individual signal values of the temporally filtered image signal 168. This causes the scaled temporally filtered image to have signal values that are equal to 25 to 75% of the signal values at corresponding locations of the corrected image 162 and further causes non-temporally varying background elements to have difference image 172 signal values that are reduced by 25-50%. The resulting difference image 172 comprise dynamic elements having nearly 100% of their irradiance values preserved form the corrected image signal 162 and non-temporally varying background elements having irradiance values reduced by 25 to 75%. As a result, the difference image 172 is displayed with more contrast between a dynamic gas plume and a non-time varying background element.

Figure 5:
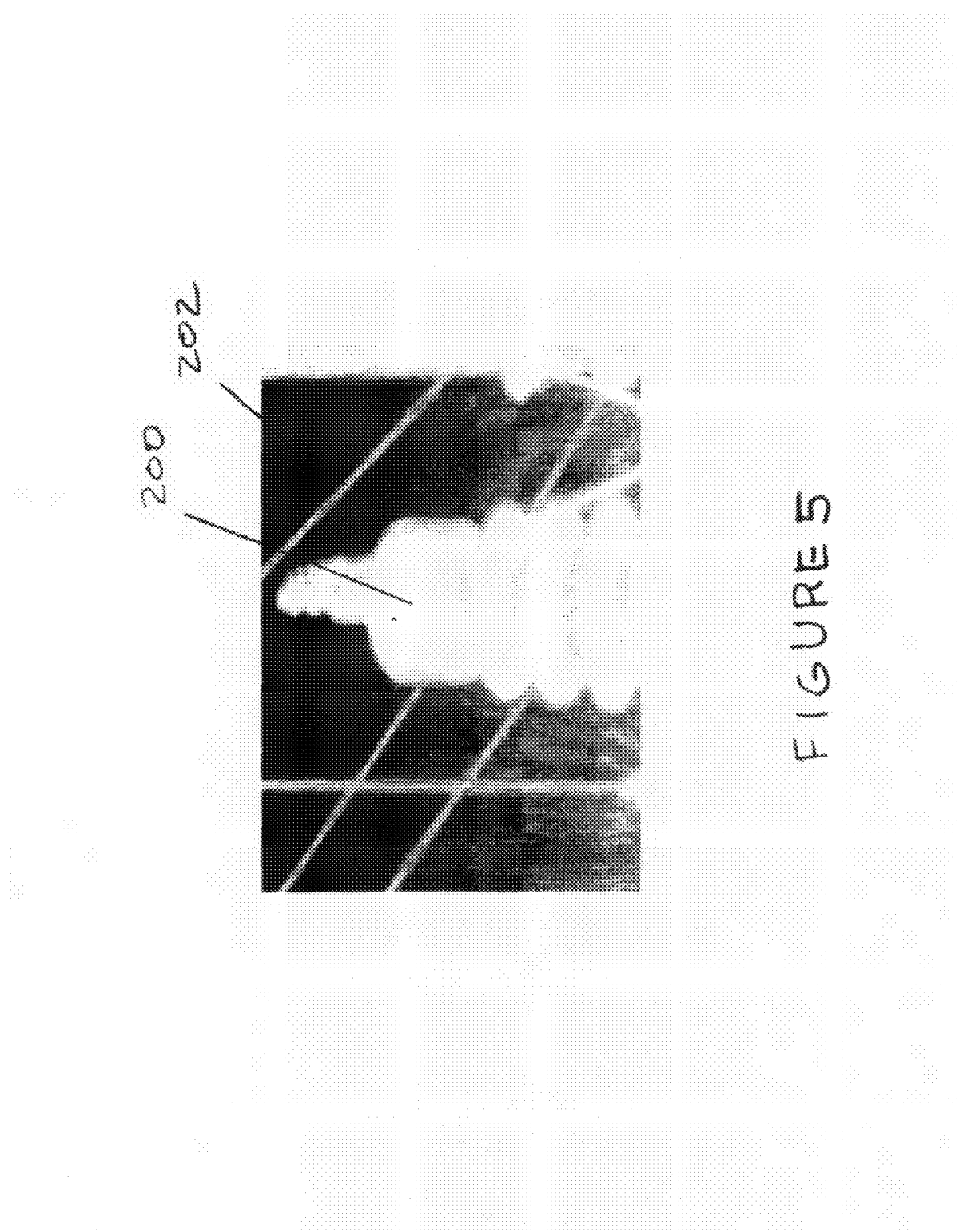
FIG. 5 illustrates a video frame of a survey scene rendered using a scaling factor of 0.0 as might rendered by a gas detection camera system of the prior art.

Referring now to FIGS. 5 and 6, each figure shows a still image comprising a single frame from a video image rendered by the camera system 100. Each frame shows a video image of a survey scene that includes a gas plume. The video frame shown in FIG. 5 is taken with the scaling factor k set at 0.0 and therefore without subtracting any portion of a temporally filtered image 168 from the corrected scene image 162. The video frame shown in FIG. 6 is taken with the scaling factor k set approximately at 0.5 such that a temporally filtered image that has been scaled by 50% has been subtracted from the corrected scene image 162 to render the video image of the frame shown in FIG. 6.

The video frames shown in FIGS. 5 and 6 each depict an electrical insulator 200 and wires 202 used in a power distribution grid. In the example survey scenes, the electrical insulator 200 is mounted more than 30 feet above ground level with the sky in the background. The video images shown in FIGS. 5 and 6 were taken by a user standing at ground level and holding the camera system 100. The electrical insulator 200 and wires 202 are the highest temperature elements in the survey scene and therefore are the brightest objects in the thermographic video image frames of FIGS. 5 and 6. In comparing the video image frame of FIG. 5 with the video image frame of FIG. 6 the brightness of the electrical insulator 200 wires 202 is reduced in the image of FIG. 6 which has 50% of the temporally filtered image 168 subtracted from the corrected scene image 162. In addition, a gas plume 206 is visible in the video image of FIG. 6 but not visible in the video image of FIG. 5. Accordingly, subtracting a scaled temporally filtered image 168 from the corrected image signal 162 improves the detectably of gas plumes in thermographic video images of survey scenes.

According to the present invention, the camera system 100 can be used in a variety of modes by changing the scaling factor k. With the scale factor k set to 0.0, the camera system operates without temporal filtering and delivers an unaltered corrected current scene image 162 directly to the video display 116. With the scale factor k set to mid-range values, e.g. 0.25-0.75, the tone or brightness of non-temporally varying background elements can be reduced in video images rendered by the camera system. This reduction in the tone or brightness of the non-temporally varying background elements tends to improve contrast between dynamic elements, e.g. gas plumes, and non-temporally varying background elements. Finally with the scale factor k set to higher values, e.g. between 0.75-1.0, the brightness of background elements with respect to dynamic elements can be further reduced thereby making dynamic elements of interest even more prominent in the video image e.g. to further study just the dynamic elements.

In a first important embodiment of the present invention, the camera system 100 is configured to detect hydrocarbon gases having an absorption bandwidth approximately ranging from (3.1-3.6 μm). Such gases may include benzene, butane, ethane, ethybenzene, ethylene, heptane, hexan, isoprene, Methyl ethyl ketone, (MEK), methanol, MIBK, octane, pentane, 1-pentane, propane, propylene, toluene and xylene. In the first embodiment, the camera system 100 includes a focal plane array 108 comprising a two dimensional array of approximately 76,800 individual Indium Arsenide (InSb) photodiodes, the spectral band pass filter 110 has a spectral transmission over the spectral range of approximately 3.0-3.7 μm and both the FPA 108 and spectral band pass filter 110 are cooled to about 77° K. during operation.

In a second important embodiment of the present invention, the camera system 100 is configured to detect industrial gases having an absorption bandwidth approximately ranging from 10.2-10.8 µm. Such gases may include sulfur hexafluoride, ($SF_6$), ammonia ($NH_3$) and uranium hexafluoride ($UF_6$). In the second embodiment, the camera system 100 includes a focal plane array 108 comprising a two dimensional array of approximately 76,800 (320×240) individual sensors comprising gallium arsenide, (GaAs), and aluminum gallium arsenide (AlGaAs) formed in thin alternating layers of GaAs quantum wells, and AlGaAs barriers to provide a quantum well infrared photo detectors, (QWIP) tuned to provided a desired spectral responsivity over the spectral range 10.2-10.8 µm. The second embodiment camera system 100 further includes a spectral band pass filter 110 with a spectral transmission over the spectral range of approximately 10.2-10.8 µm and both the FPA 108 and the spectral band pass filter 110 are cooled to about 65° K. during operation.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. for increasing the detectability of a gas plume in a thermographic video image, those skilled in the art will recognize that its usefulness is not limited thereto and that the present invention can be beneficially utilized in any number of environments and implementations including but not limited to any other application wherein it would be useful to distinguish non-time varying elements from dynamic elements in video images of a survey scene. Accordingly, the claims set forth below should be construed in view of the full breadth and spirit of the invention as disclosed herein.

The invention claimed is:

1. A camera system comprising:
   means for generating a corrected scene image signal comprising a series of signals corresponding with irradiance values at a plurality of locations of a scene image;
   means for refreshing the corrected scene image signal at a video frame refresh rate;
   a temporal filter memory for storing a temporally filtered scene image therein, said temporally filtered scene image comprising image signals corresponding with a temporal characteristic of irradiance values at each of the plurality of locations of the scene image over a selected time period;
   a temporal filter for receiving the corrected scene image and the temporally filtered scene image therein, for comparing the corrected scene image with the temporally filtered scene image, and for updating the temporally filtered scene image according to a temporal weighting factor based on a difference between corrected image signal values and temporally filtered image signal values and for storing an updated temporally filtered scene image in the temporal filter memory; and,
   an image difference calculator for receiving the corrected scene image signal and the updated temporally filtered scene image signal therein, for scaling the updated temporally filtered scene image signal by a scaling factor and for subtracting the scaled updated temporally filtered scene image from the corrected scene image to generate a difference scene image signal comprising a series of image signals corresponding with each of the plurality of locations of the scene image.

2. The camera system of claim 1 further comprising a display device for displaying the difference image.

3. The camera system of claim 2 wherein the image difference calculator includes multiplier block which multiplies the update temporally filtered scene image by the scaling factor and wherein the scaling factor ranges from 0.0 to 1.0.

4. The camera system of claim 3 wherein the scaling factor ranges from 0.25 to 0.75.

5. The camera system of claim 3 wherein the scaling factor is selectable according to a user input command.

6. The camera system of claim 5 wherein the means for generating the corrected scene image signal comprises:
   a lens element for collecting radiation from a survey scene and forming the scene image at a focal plane of the lens element;
   an image sensor comprising a plurality of photosensitive elements disposed in the focal plane of the lens element, wherein the location of each photosensitive element corresponds with one of the plurality of locations of the scene image and further wherein each photosensitive element generates an analog signal in proportion to an irradiance value at one of the plurality of locations of the scene image;
   an analog to digital converter for converting the analog signal of each photosensitive element to a digital signal corresponding with irradiance values at each of the plurality of locations of the scene image; and,
   one or more logic blocks in communication with one or more memory blocks for correcting the digital image signal in accordance with calibration data stored in the one or more memory blocks.

7. The camera system of claim 6 wherein the plurality of photosensitive elements have a spectral responsibility over a spectral bandwidth that includes an absorption band of a gas to be detected in the difference image.

8. The camera system of claim 7 further comprising a spectral band pass filter disposed between the lens element and the image sensor for limiting the spectral bandwidth of the scene image to a spectral bandwidth approximately corresponding with an absorption band of a gas to be detected in the difference image.

9. The camera system of claim 8 further comprising a refrigeration device configured to cool the focal plane array and the optical band pass filter to an operating temperature of less than 100° K.

10. The camera system of claim 9 further comprising a vacuum tight enclosure formed to enclose the focal plane array and the optical band pass filter in a vacuum cavity drawn down to a vacuum pressure.

11. The camera system of claim 10 further comprising:
    a camera housing of enclosing and supporting the focal plane array, the band pass filter, the vacuum tight enclosure, the refrigeration device and the video display device therein and for supporting the lens element attached externally thereto;
    an electronics module for operating the camera system and including the temporal filter, temporal filter memory and the difference calculator, enclosed within the camera housing;
    a user interface module in communication with the electronics module comprising actuator elements disposed on external surfaces of the camera housing for converting user actions into input commands suitable for operating the camera in one or more operating modes; and,
    a power module in communication with the electronics module and including a power source enclosed with the camera housing for operating the camera system as a portable device.

12. The camera system of claim 6 wherein the plurality of photosensitive elements comprise indium arsenide (InSb) photodiodes.

13. The camera system of claim 6 wherein the plurality of plurality of photosensitive elements comprise quantum well infrared photo detectors, (QWIP), formed by quantum well layers alternating with barrier layers, and wherein each layer is constructed from a III-V compound semiconductor.

14. The camera of claim 13 wherein the quantum well layers comprise GaAs doped with silicon and the barrier layers comprise AlGaAs.

15. A method for rendering a video image of a survey scene comprising the steps of:
   forming a scene image onto a focal plane array;
   generating a corrected scene image signal comprising a series of signals corresponding with irradiance values at plurality of locations of the scene image and continuously updating the scene image signal at a video frame rate;
   for each scene image signal, generating a temporally filtered image signal based on temporal characteristics of irradiance values at each of the plurality of locations of the scene image over a selected number of previous video frames;
   storing the temporally filtered image signal in a temporal filter memory block;
   multiplying the temporally filtered image signal by a scaling factor to reduce the temporally filtered image signal at each of the plurality of locations of the scene image thereby generating a sealed temporally filtered image signal; and,
   generating a difference image signal by subtracting the sealed temporally filtered image signal from the scene image signal.

16. The method of claim 15 further comprising the step of displaying the difference image signal.

17. The method of claim 16 further comprising the step of storing the temporally filtered image signal in a temporal filter memory block.

18. The method of claim 16 wherein the step of forming a scene image onto the focal plane array further comprises the step of spectrally filtering the scene image such that the spectral bandwidth of the scene image corresponds with an infrared absorption band of a gas to be detected in the difference image.

19. The method of claim 16 wherein the step of generating the temporally filtered scene image comprises the steps of summing scene image values over a selected number of video frames and dividing the summed scene image values by the selected number of video frames.

20. The method of claim 16 wherein the step of generating the temporally filtered scene image comprises the steps of:
   recalling a current temporally filtered scene image from the temporal filter memory block;
   subtracting the current temporally filtered scene image from the corrected scene image;
   generating scaled difference values by scaling difference values between the current temporally filtered scene image and the corrected scene image to increase larger difference values more than smaller difference values; and,
   generating an updated temporally filtered scene image by adding the sealed difference values to the current temporally filtered image values.

21. The method of claim 16 further comprising the step of selecting the number of previous video frames for generating the temporally filtered image.

22. The method of claim 16 further comprising the step of selecting the scaling factor from values ranging from 0.0 to 1.0.

23. A gas leak detection camera comprising:
   a lens element for collecting radiation from a survey scene and forming a scene image of the survey scene at a focal plane of the lens element;
   an image sensor disposed at the focal plane of the lens element comprising a plurality of photosensitive elements disposed at a plurality of locations over the scene image for generating analog signals corresponding with irradiance values at each of the plurality of locations of a scene image, wherein the image sensor has a spectral responsivity that includes wavelengths of an absorption band of a gas to be detected;
   read out electronics for reading out the analog signals and refreshing the analog scene signals at a video frame rate;
   a spectral band pass filter disposed between the lens element and the image sensor for limiting the spectral band width of scene image to a spectral bandwidth approximately corresponding with wavelengths of an absorption band of the gas to be detected;
   an optical signal processor configured to convert the analog signals to a digital scene image signal, to generate a temporally filtered image signal corresponding with temporal characteristics of a plurality of prior digital scene images, to produce a scaled temporally filtered image by reducing the temporally filtered image by a scaling factor, and to generate a difference image by subtracting the scaled temporally filtered image from the digital scene image;
   a digital data storage module in communication with the optical signal processor for storing the temporally filtered image therein; and,
   a display device for displaying the difference image.

24. The gas leak detection camera of claim 23 wherein the scaled temporally filtered image is produced by multiplying the temporally filtered image by a scaling factor ranging from 0.0 to 1.0 and further comprising a user interface element in communication with the optical signal process for varying the scaling factor according to user input commands.

25. The gas leak detection camera of claim 24 further comprising:
   a cooling device for cooling the image sensor and the spectral band pass filter to operating temperatures below 100° K.; and,
   a vacuum tight enclosure formed to enclose the focal plane array and the optical band pass filter in a vacuum cavity drawn down to a vacuum pressure.

26. The gas detection camera of claim 25 wherein the photosensitive elements comprise indium arsenide (InSb) photodiodes and further wherein the spectral band pass filter has a spectral bandwidth that includes wavelengths in the range of 3.1 to 3.6 μm.

27. The gas detection camera of claim 25 wherein the photosensitive elements comprise quantum well infrared photo detectors, (QWIP), tuned to have a spectral responsivity above 5.5 μm.

28. A camera system comprising:
   a focal plane array and a lens system for forming a scene image corresponding with a survey scene onto the focal plane array;
   an optical signal processor;
   a temporal filter for temporally filtering a scene image over a plurality of video frames and storing a temporally filtered image in a temporal filter memory module;
   an image difference block for generating a difference image by reducing values of the temporally filtered image by multiplying each value thereof by a scaling factor (k) ranging between 0.0 and 1.0 and subtracting the reduced values of the temporally filtered image from corresponding current scene image.

29. The camera system of claim 28, wherein the focal plane array comprises a plurality of photosensitive elements each having a spectral responsibility over a spectral bandwidth that includes one or more infrared absorption bands of a gas plume to be distinguished from other regions of the scene.

30. A method for processing a survey scene to detect a gas comprising the steps of
   (i) providing an infrared camera system to image the survey scene;
   (ii) obtaining a plurality of images of the survey scene;
   (iii) obtaining a temporal filtered image from a predetermined number of the images; and
   (iv) obtaining a difference image by subtracting a product of the temporal filtered image and a scaling factor (k) from a preselected image, wherein $0.0 < k < 1.0$.

31. The method of claim 30 further comprising the step of spectrally filtering the survey scene to limit the spectral bandwidth of the survey scene to a selected infrared absorption band of a gas plume to be distinguished from other regions of the survey scene.

* * * * *